(12) United States Patent
Gorbatov et al.

(10) Patent No.: US 9,213,390 B2
(45) Date of Patent: Dec. 15, 2015

(54) PERIODIC ACTIVITY ALIGNMENT

(71) Applicant: Intel Corporation, Santa Clara, CA (US)

(72) Inventors: Eugene Gorbatov, Hillsboro, OR (US); Paul S. Diefenbaugh, Portland, OR (US); John H. Crawford, Saratoga, CA (US); Anil K. Kumar, Chandler, AZ (US); Richard J. Greco, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 238 days.

(21) Appl. No.: 13/730,074

(22) Filed: Dec. 28, 2012

(65) Prior Publication Data

US 2014/0189403 A1 Jul. 3, 2014

(51) Int. Cl.
*G06F 1/32* (2006.01)

(52) U.S. Cl.
CPC ................... *G06F 1/3206* (2013.01)

(58) Field of Classification Search
USPC ......................................... 713/300, 320, 323
See application file for complete search history.

(56) References Cited

U.S. PATENT DOCUMENTS

| 7,383,457 | B1 * | 6/2008 | Knight | 713/323 |
| 8,332,676 | B2 * | 12/2012 | Lyra et al. | 713/323 |
| 8,452,995 | B1 * | 5/2013 | Lachwani et al. | 713/320 |
| 8,572,420 | B2 * | 10/2013 | Dutton et al. | 713/323 |
| 8,862,916 | B2 | 10/2014 | Lee et al. | |
| 2004/0123169 | A1 * | 6/2004 | Elnozahy et al. | 713/320 |
| 2007/0079154 | A1 | 4/2007 | Diefenbaugh et al. | |
| 2007/0197186 | A1 | 8/2007 | Muqattash et al. | |
| 2009/0150696 | A1 * | 6/2009 | Song et al. | 713/323 |
| 2009/0172434 | A1 * | 7/2009 | Kwa et al. | 713/320 |
| 2010/0077243 | A1 | 3/2010 | Wang et al. | |
| 2010/0083017 | A1 | 4/2010 | Fulkerson et al. | |
| 2010/0095146 | A1 * | 4/2010 | Gelonese | 713/324 |
| 2011/0055604 | A1 * | 3/2011 | Jackson | 713/320 |
| 2011/0131427 | A1 | 6/2011 | Jorgenson et al. | |
| 2011/0185209 | A1 * | 7/2011 | Shimotono | 713/323 |
| 2012/0210104 | A1 * | 8/2012 | Danko | 712/229 |
| 2013/0198540 | A1 * | 8/2013 | Lee et al. | 713/320 |
| 2014/0189398 | A1 * | 7/2014 | Gorbatov et al. | 713/323 |

FOREIGN PATENT DOCUMENTS

TW 201249049 A 12/2012

OTHER PUBLICATIONS

International Search Report and Written Opinion received for Patent Application No. PCT/US2013/047778, mailed on Oct. 9, 2013, 11 pages.
Office Action for Taiwanese Patent Application No. 102146390, dated Jul. 6, 2015, 16 Pages, includes 8 Pages of English translation.

* cited by examiner

*Primary Examiner* — Vincent Tran
(74) *Attorney, Agent, or Firm* — Jordan IP Law, LLC

(57) ABSTRACT

Methods and systems may provide for determining a latency constraint associated with a platform and determine an idle window based on the latency constraint. In addition, a plurality of devices on the platform may be instructed to cease one or more activities during the idle window. In one example, the platform is placed in a sleep state during the idle window.

20 Claims, 2 Drawing Sheets

PERIODIC ACTIVITY ALIGNMENT

BACKGROUND

1. Technical Field

Embodiments generally relate to power management in computing platforms. More particularly, embodiments relate to periodic activity alignment to enhance power efficiency in computing platforms.

2. Discussion

Computing platforms may enter various sleep states during periods of idleness in order to reduce power consumption. Sleep state entry may be effectively disabled, however, during semi-active workloads due to key elements of the platform such as processor/graphics cores, main memory, system interconnects, etc., becoming even lightly active. Accordingly, conventional platforms may experience a steep drop in energy efficiency when processing typical semi-active workloads.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
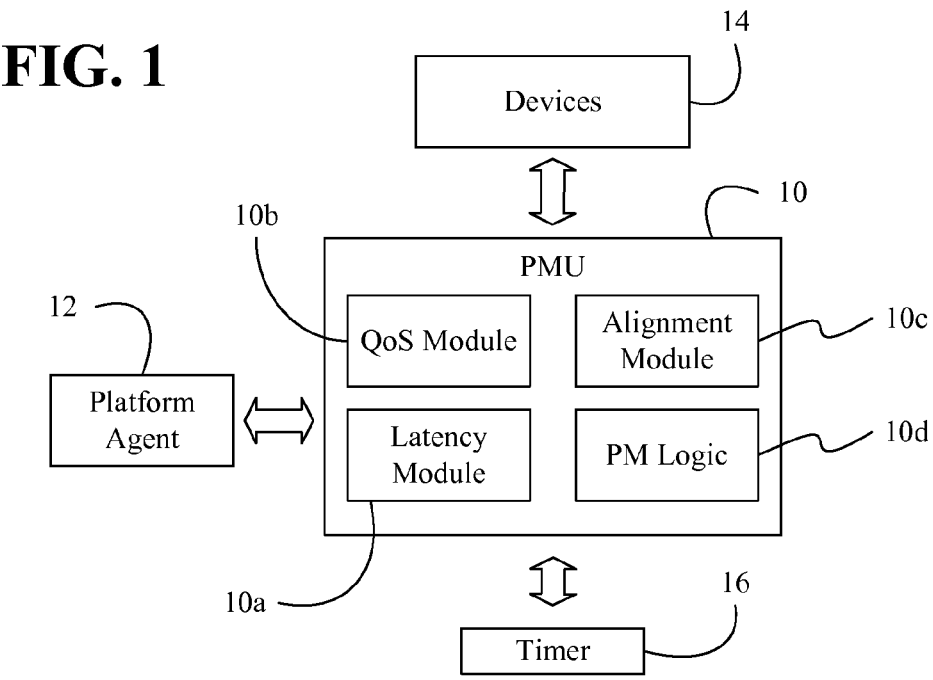
FIG. 1 is a block diagram of an example of a power management unit according to an embodiment.

FIG. 1 shows a power management unit (PMU) 10 (10a-10d) that may be used to achieve greater energy efficiency in a computing platform such as, for example, a mobile device having computing functionality (e.g., personal digital assistant/PDA, laptop, smart tablet), communications functionality (e.g., wireless smart phone), imaging functionality, media playing functionality (e.g., smart television/TV), or any combination thereof (e.g., mobile Internet device/MID). The illustrated PMU 10 may also be used in a fixed platform such as, for example, a server, desktop computer, workstation, and so forth.

In the illustrated example, a quality of service (QoS) module 10a (e.g., latency module) determines latency constraints associated with the platform, wherein the latency constraints may be determined based on service requests (e.g., QoS requests, service level agreement/SLA requests), performance level requests (e.g., ACPI/Advanced Configuration and Power Interface performance state requests, e.g., ACPI Specification, Rev. 5.0a, Dec. 6, 2011), and so forth. The latency-related requests may be made by, for example, a platform agent 12 associated with one or more applications and/or an operating system (OS) executing on the platform. As will be discussed in greater detail, the latency constraints may generally establish maximum latencies that are tolerated by a workload of the platform. For example, an SLA for a server workload might stipulate that the workload be completed within x milliseconds, a particular ACPI performance state (P-state) may be associated with a particular maximum latency (e.g., via lookup table), and so forth. The requests may be issued directly to the PMU 10 or indirectly to the PMU 10 by, for example, changing one or more register values, configuration settings, and so forth.

The PMU 10 may also include an idleness module 10b that determines idle windows based on the latency constraints. In one example, idle windows are a function of the latency tolerance and the predicted idleness (e.g., idle window=predicted idleness+latency tolerance). The PMU 10 may also include an alignment module 10c that instructs a plurality of devices 14 to cease one or more activities (e.g., external communication) during the idle window. The devices 14 may include, for example, input output (IO) devices, processors, system controllers, etc., that prevent the platform from entering sleep states when one or more of the devices 14 are issuing interrupts, DMA (direct memory access) requests, fabric access requests, etc., (e.g., active). The PMU 10 may therefore force an alignment of all devices on a platform and create a platform wide idle window. In one example, the PMU 10 uses a timer 16 to determine when the idle window has closed/expired, wherein the alignment module 10c may initiate active windows in response to expirations of the timer 16. The illustrated PMU 10 also includes power management (PM) logic 10d that places the platform in sleep states during the idle windows. Of particular note is that by forcing the devices 14 to cease communication/activity, the alignment module 10c can create platform wide idle windows rather than merely extend idle windows that may (or may not) occur naturally. Moreover, the sleep states selected by the PM logic 10d may be deeper, more frequent and longer lasting using the illustrated approach, which may in turn yield greater energy efficiency, longer battery life and enhanced performance.

Figure 2:
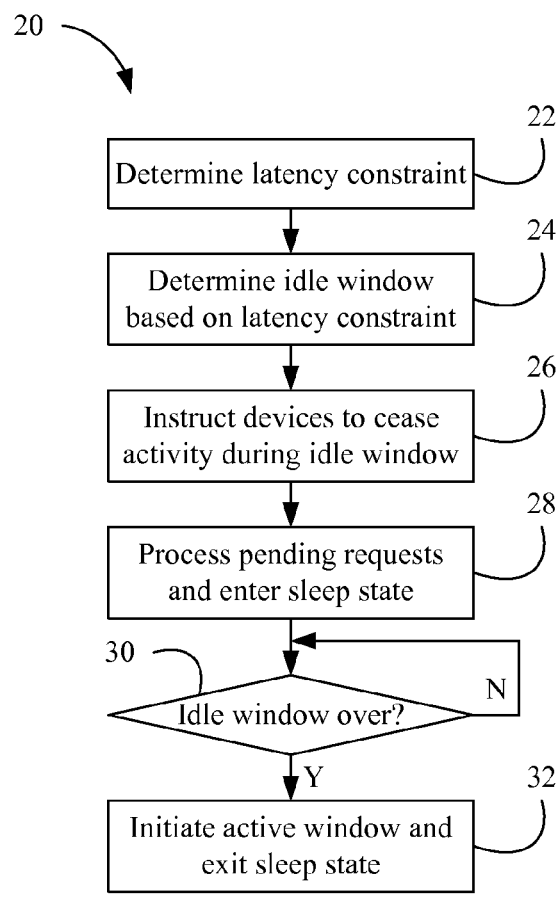
FIG. 2 is a flowchart of an example of a method of managing power in a computing platform according to an embodiment.

FIG. 2 shows a method 20 of managing power in a computing platform. The method 20 may be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 20 may be written in any combination of one or more programming languages, including an object oriented programming language such as Java, Smalltalk, C++ or the like and conventional procedural programming languages, such as the "C" programming language or similar programming languages.

Illustrated processing block 22 provides for determining a latency constraint associated with a platform. As already noted, the latency constraint may be determined based on a service request, a performance level request, etc., wherein the latency constraint may define a maximum latency for the platform and/or a workload being executed on the platform. Block 24 may determine an idle window based on the latency constraint, and a plurality of devices on the platform may be instructed at block 26 to cease one or more activities during the idle window. Ceasing activity may involve buffering data such as DMA requests and interrupts, so that no IO activity will occur, entering a device sleep state, and so forth. Accordingly, the illustrated approach provides for forced alignment of all devices/controllers/blocks in the platform to create system wide idle windows. Such an approach can provide significant advantages over conventional solutions that merely wait for idle windows to occur naturally.

With specific regard to the requests that are delayed during the idle window, an IO request may originate upstream (e.g., from a device) or downstream (e.g., from the OS/software) from the perspective of the power management unit. Both could be delayed during the idle window, but the latency tolerance for each may be treated separately as another optimization. For example, an IO device may have a much tighter latency constraint for accessing main memory than software has for receiving interrupts.

Block 26 may also involve setting a timer such as the timer 16 (FIG. 1), already discussed. Illustrated block 28 processes any pending requests from the platform devices and places the platform and/or processor in a sleep state such as an ACPI low power state, wherein a determination may be made at block 30 as to whether the idle window is closed/over. If so, an active window is initiated at illustrated block 32 and the platform/processor may be brought out of the sleep state. Initiating the active window may include instructing the devices to resume activity, wherein any devices having data and/or instructions, transactions, messages, DMA requests, interrupts, etc., for processing, may issue the appropriate signals to the platform to conduct the activity in question.

In addition, portions of the method 20 may be repeated for relatively long periods of time until conditions change. Moreover, the method 20 may also be disabled if it is determined that the platform utilization is above a certain threshold (e.g., above 20%, low core C6 utilization, etc.). For example, the platform utilization is above a certain percentage, it may be inferred that forced creation of platform wide idle windows will not be productive. Similarly, if is determined that a relatively large number of cores have not been entering deep sleep states, the illustrated approach might be bypassed.

Figure 3A:
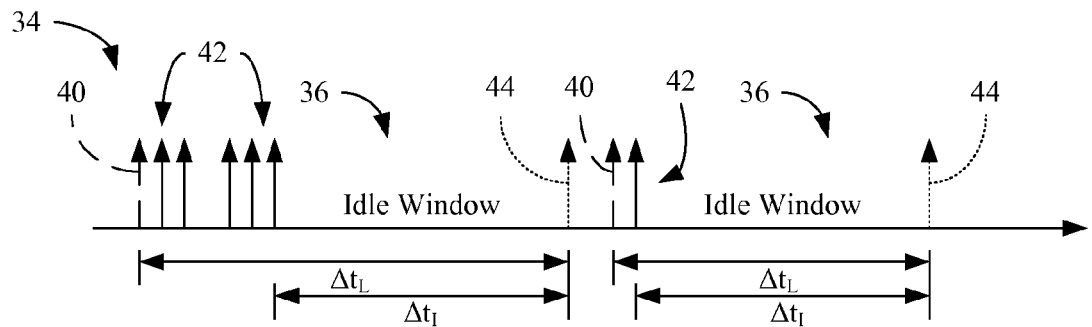
FIGS. 3A and 3B are timelines of examples of idle windows according to embodiments.

FIG. 3A shows a timeline 34 in which idle windows 36 ($\Delta t_I$) are created by instructing platform devices to cease one or more activities. In the illustrated example, a latency constraint window ($\Delta t_L$) is determined, wherein a timer arming 40 may be conducted to mark the beginning of the latency constraint window. One or more pending requests 42 from the platform devices may be processed before placing the platform and/or processor in a sleep state during the idle windows 36. Timer expirations 44 may take place to mark the end of the idle windows 36, wherein the platform/processor may be brought out of the sleep state to process information during an active window occurring between the latency constraint windows.

Figure 3B:
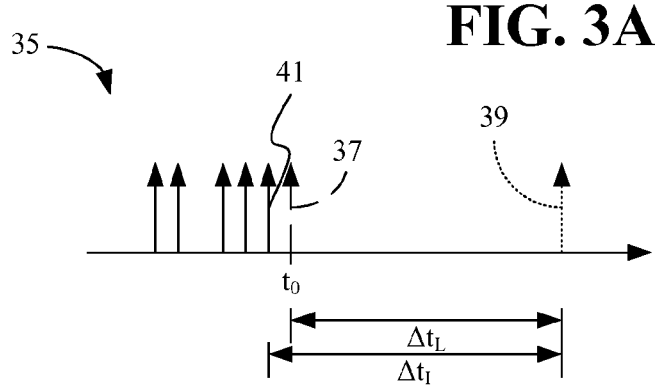

FIG. 3B shows another timeline 35 in which an idle window ($\Delta t_I$) is created by instructing platform devices to cease one or more activities. In the illustrated example, at some time $t_0$ after a final IO request 41 and during the idle window, an IO request is acknowledged but the corresponding IO transfer is delayed because the IO request occurs during the idle window. Also at time $t_0$, a timer arming 37 may be conducted to mark the beginning of the latency constraint window ($\Delta t_L$), wherein a timer expiration 39 can later take place to mark the end of the idle window. The illustrated approach therefore enables allows the idle window to consume the entire latency tolerance. Simply put, the idle window may be longer or shorter than the latency constraint window. If the idle window is longer than the latency constraint window, the latency tolerance may still be observed—the system just doesn't begin counting until the first access is attempted in such a scenario.

Figure 4:
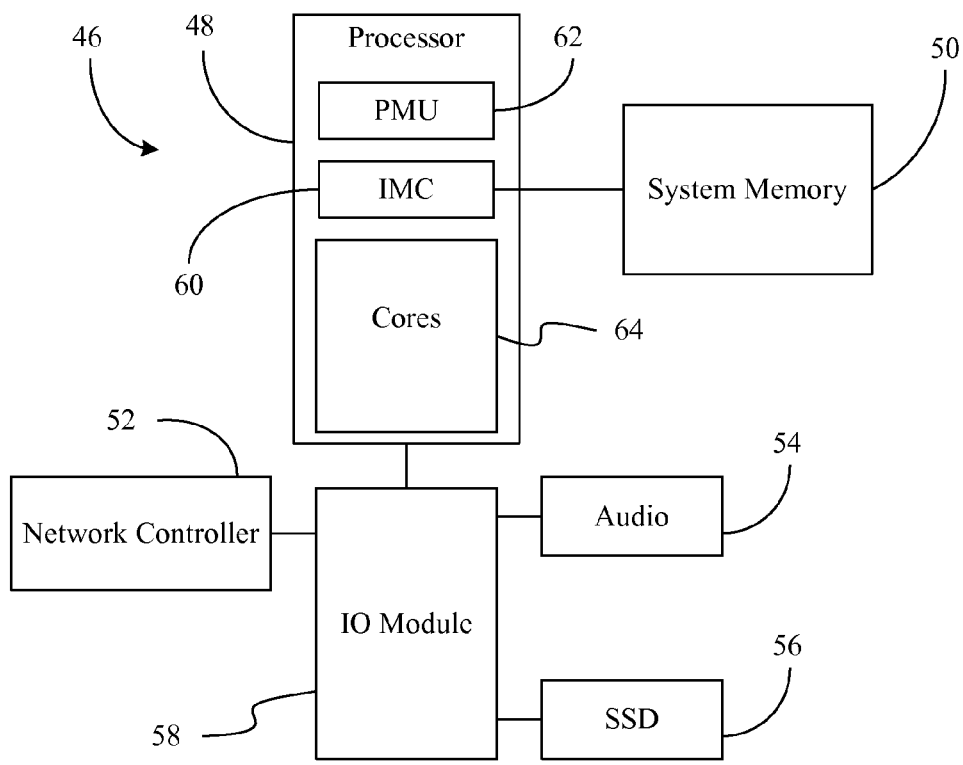
FIG. 4 is a block diagram of an example of a platform according to an embodiment.

Turning now to FIG. 4, a mobile platform 46 is shown. The platform 46 may be part of a device having computing functionality (e.g., server, workstation, desktop computer, PDA, notebook computer, smart tablet), communications functionality (e.g., wireless smart phone), imaging functionality, media playing functionality (e.g., smart TV), or any combination thereof (e.g., MID). In the illustrated example, the platform 46 includes a processor 48, system memory 50, a network controller 52, an audio IO device 54, a solid state disk (SSD) 56, and an IO module 58. The processor 48 may include an integrated memory controller (IMC) 60, a power management unit (PMU) 62 and a core region with one or several processor cores 64. The processor 48 and the IO module 58 may alternatively be implemented on the semiconductor die as a system on chip (SoC), depending upon the circumstances. Additionally, the platform 46 may also include other components such as dedicated graphics components (not shown), and so forth.

The illustrated IO module 58, sometimes referred to as a Southbridge or South Complex of a chipset, functions as a host controller and communicates with the network controller 52, which could provide off-platform communication functionality for a wide variety of purposes such as, for example, cellular telephone (e.g., Wideband Code Division Multiple Access/W-CDMA (Universal Mobile Telecommunications System/UMTS), CDMA2000 (IS-856/IS-2000), etc.), WiFi (Wireless Fidelity, e.g., Institute of Electrical and Electronics Engineers/IEEE 802.11-2007, Wireless Local Area Network/LAN Medium Access Control (MAC) and Physical Layer (PHY) Specifications), 4G LTE (Fourth Generation Long Term Evolution), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The IO module 58 may also include one or more wireless hardware circuit blocks to support such functionality.

The system memory 50 may include, for example, double data rate (DDR) synchronous dynamic random access memory (SDRAM, e.g., DDR3 SDRAM JEDEC Standard JESD79-3C, April 2008) modules. The modules of the system memory 50 may be incorporated into a single inline memory module (SIMM), dual inline memory module (DIMM), small outline DIMM (SODIMM), and so forth. The SSD 56 may include one or more NAND (negated AND) chips and might be used to provide high capacity data storage and/or a significant amount of parallelism. There may also be solutions that include NAND controllers implemented as separate ASIC controllers being connected to the IO module 58 on standard buses such as a Serial ATA (SATA, e.g., SATA Rev. 3.0 Specification, May 27, 2009, SATA International Organization/SATA-IO) bus, or a PCI Express Graphics (PEG, e.g., Peripheral Components Interconnect/PCI Express x16 Graphics 150W-ATX Specification 1.0, PCI Special Interest Group) bus. The SSD 56 could also be used as a USB (Universal Serial Bus, e.g., USB Specification 3.0, USB Implementers Forum) flash storage device.

The illustrated cores 64 of the processor 48, system memory 50, network controller 52, IO module 58, audio IO device 54 and SSD 56 may therefore be considered devices of the platform 46, wherein the PMU 62 may generally have functionality similar to that of the PMU 10 (FIG. 1), already discussed. Accordingly, the PMU 62 may be configured to determine latency constraints associated with the platform 46, determine idle windows based on the latency constraints, and instruct the cores 64, system memory 50, network controller 52, audio IO device 54, SSD 56 and/or IO module 58 to cease one or more activities during the idle windows. Moreover, the PMU 62 may place the platform 46 and/or processor 48 in sleep states during the idle windows, wherein the sleep states may be deeper, more frequent and longer lasting than under conventional solutions. The platform devices themselves may also enter deeper sleep states, depending upon the circumstances.

Thus, techniques described herein may provide significant benefits to both client and server systems. For example, semi-active workloads such as web browsing and video conferencing may be executed on mobile platforms with much greater energy efficiency and battery life. In servers, the opportunity to enter platform idle states may be preserved even as the number of cores increases. For example, in dual-processor server systems with twelve cores (i.e., twenty-four threads per socket), package C-states and platform idle states (e.g., ACPI) may still be used by transforming long "dribbles" of activity into short bursts of activity followed by quasi-deterministic idle windows/periods. Moreover, QoS constraints and PLA commitments may be met in a manner that is transparent to the OS and applications. Indeed, energy efficiency savings may be two to three times greater for semi-active workloads under the techniques described herein.

Embodiments may therefore include a method that provides for determining a latency constraint associated with a platform and determining an idle window based on the latency constraint. Additionally, a plurality of devices on the platform may be instructed to cease one or more activities during the idle window.

Embodiments may also include a non-transitory computer readable storage medium having a set of instructions which, if executed by a processor, cause a platform to determine a latency constraint associated with a platform. The instructions, if executed, may also cause the platform to determine an idle window based on the latency constraint and instruct a plurality of devices on the platform to cease one or more activities during the idle window.

Embodiments may also include an apparatus having a latency module to determine a latency constraint associated with a platform and an idleness module to determine an idle window based on the latency constraint. The apparatus may also have an alignment module to instruct a plurality of devices on the platform to cease one or more activities during the idle window.

Embodiments may also include a platform having a plurality of devices, wherein the plurality of devices includes one or more of input output (IO) devices and system controllers. The platform may also include a power management unit having a latency module to determine a latency constraint associated with the platform, an idleness module to determine an idle window based on the latency constraint, and an alignment module to instruct the plurality of devices to cease one or more activities during the idle window.

Embodiments of the present invention are applicable for use with all types of semiconductor integrated circuit ("IC") chips. Examples of these IC chips include but are not limited to processors, controllers, chipset components, PLAs, memory chips, network chips, SoCs, SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A platform comprising:
   a plurality of devices including a processor and one or more of input output (IO) devices, and system controllers; and
   a power management unit including,
      a latency module to determine a latency constraint associated with the platform,
      an idleness module to determine an idle window based on the latency constraint,
      an alignment module to instruct the plurality of devices to cease an activity during the idle window, wherein ceasing activity includes buffering one or more of DMA requests or interrupts; and
      a timer, wherein the alignment module is to set the timer based on the latency constraint and wherein the alignment module is to initiate an active window in response to an expiration of the timer.

2. The platform of claim 1, wherein the power management unit further includes power management logic to place one or more components of the platform in a sleep state during the idle window.

3. The platform of claim 1, wherein the activity is to include external communication, and wherein the idle window is to be a platform wide idle window.

4. The platform of claim 1, wherein the alignment module is to instruct the plurality of devices to resume activity to initiate the active window.

5. The platform of claim 1, wherein the latency constraint is to be determined based on one or more of a service request and a performance level request.

6. An apparatus comprising:
a latency module to determine a latency constraint associated with a platform;
an idleness module to determine an idle window based on the latency constraint; and
an alignment module to instruct a plurality of devices including a processor and one or more of input output (IO) devices and system controllers on the platform to cease an activity during the idle window, wherein ceasing activity includes buffering one or more of DMA requests or interrupts;
a timer, wherein the alignment module is to set the timer based on the latency constraint and wherein the alignment module is to initiate an active window in response to an expiration of the timer.

7. The apparatus of claim 6, further including power management logic to place the platform in a sleep state during the idle window.

8. The apparatus of claim 6, wherein the activity is to include external communication, and wherein the idle window is to be a platform wide idle window.

9. The apparatus of claim 6, wherein the alignment module is to instruct the plurality of devices to resume activity to initiate the active window.

10. The apparatus of claim 6, wherein the latency constraint is to be determined based on one or more of a service request and a performance level request.

11. A method comprising:
determining a latency constraint associated with a platform;
determining an idle window based on the latency constraint;
instructing a plurality of devices including a processor and one or more of input output (IO) devices and system controllers on the platform to cease an activity during the idle window, wherein ceasing activity includes buffering one or more of DMA requests or interrupts;
setting a timer based on the latency constraint; and
initiating an active window in response to an expiration of the timer.

12. The method of claim 11, further including placing one or more components of the platform in a sleep state during the idle window.

13. The method of claim 12, wherein the activity includes external communication, and wherein the idle window is a platform wide idle window.

14. The method of claim 11, wherein initiating the active window includes instructing the plurality of devices to resume activity.

15. The method of claim 11, wherein the latency constraint is determined based on one or more of a service request and a performance level request.

16. A non-transitory computer readable storage medium comprising a set of instructions which, if executed by a processor, cause a platform to:
determine a latency constraint associated with the platform;
determine an idle window based on the latency constraint;
instruct a plurality of devices including a processor and one or more of input output (IO) devices and system controllers on the platform to cease an activity during the idle window, wherein ceasing activity includes buffering one or more of DMA requests or interrupts;
set a timer based on the latency constraint; and
initiate an active window in response to an expiration of the timer.

17. The medium of claim 16, wherein the instructions, if executed, cause the platform to place one or more components of the platform in a sleep state during the idle window.

18. The medium of claim 17, wherein the activity is to include external communication, and wherein the idle window is to be a platform wide idle window.

19. The medium of claim 16, wherein the instructions, if executed, cause the platform to instruct the plurality of devices to resume activity to initiate the active window.

20. The medium of claim 16, wherein the latency constraint is to be determined based on one or more of a service request and a performance level request.

* * * * *